US012608246B2

(12) United States Patent
Ajaykumar et al.

(10) Patent No.: US 12,608,246 B2
(45) Date of Patent: Apr. 21, 2026

(54) HARDWARE-ASSISTED SPINLOCK

(71) Applicant: Advanced Micro Devices, Inc., Santa Clara, CA (US)

(72) Inventors: Shreeroop Ajaykumar, Kannur (IN); Shaju Abraham, Bangalore (IN); Naveen M, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 163 days.

(21) Appl. No.: 18/535,009

(22) Filed: Dec. 11, 2023

(65) Prior Publication Data

US 2025/0190282 A1 Jun. 12, 2025

(51) Int. Cl.
*G06F 9/52* (2006.01)

(52) U.S. Cl.
CPC .................................... *G06F 9/526* (2013.01)

(58) Field of Classification Search
CPC ...................................................... G06F 9/526
USPC ......................................................... 710/200
See application file for complete search history.

(56) References Cited

U.S. PATENT DOCUMENTS

| | | | | | |
|---|---|---|---|---|---|
| 8,954,409 | B1 * | 2/2015 | Kerem | ................ | G06F 16/2308 707/704 |
| 11,641,446 | B2 * | 5/2023 | Li | ........................... | G06T 7/246 348/441 |
| 2003/0065894 | A1 * | 4/2003 | Bonola | .................... | G06F 9/526 711/152 |
| 2008/0183979 | A1 * | 7/2008 | Larson | .................... | G06F 9/526 711/154 |
| 2008/0184238 | A1 * | 7/2008 | Ruemmler | ................ | G06F 9/52 718/102 |
| 2013/0061005 | A1 * | 3/2013 | Overby | ................. | G06F 1/3225 711/E12.001 |
| 2017/0344403 | A1 * | 11/2017 | Stults | ...................... | G06F 9/524 |
| 2018/0004411 | A1 * | 1/2018 | Long | ................... | G06F 9/45558 |
| 2018/0011744 | A1 * | 1/2018 | Liguori | ..................... | G06F 9/52 |
| 2018/0314463 | A1 * | 11/2018 | Katayama | ............. | G06F 3/0659 |
| 2019/0073243 | A1 * | 3/2019 | Jiang | ..................... | G06F 9/5094 |
| 2024/0126603 | A1 * | 4/2024 | Greene | .................. | G06F 9/526 |
| 2024/0411556 | A1 * | 12/2024 | Saha | ....................... | G06F 9/468 |

* cited by examiner

*Primary Examiner* — Christopher B Shin
(74) *Attorney, Agent, or Firm* — FIG. 1 Patents

(57) ABSTRACT

An example system includes a plurality of wait queues implemented in a first portion of a memory unit configured to store a plurality of lock requests. The system includes a lock head array implemented in a second portion of the memory unit configured to store a plurality of lock heads. Each wait queue of the plurality of wait queues is mapped to one lock head in the lock head array. The system includes a lock waiter array implemented in a third portion of the memory unit configured to store a number of entries corresponding to each lock head in the lock head array. The system also includes a spinlock controller including hardware circuitry configured to execute a lock logic responsive to a lock acquire request of the plurality of lock requests, and to execute an unlock logic responsive to a lock release request of the plurality of lock requests.

20 Claims, 8 Drawing Sheets

200 addr_lock_var 202 op 204 core_id 206 x-bit(s)

y-bit(s)

z-bit(s)

Lock Request

400

| Valid 402 | Active 404 | Zero 406 | Lock 408 | core_id 410 |
|---|---|---|---|---|
| —1-bit— | —1-bit— | —1-bit— | —1-bit— | —x-bit(s)— |

Lock Waiter Array Entry

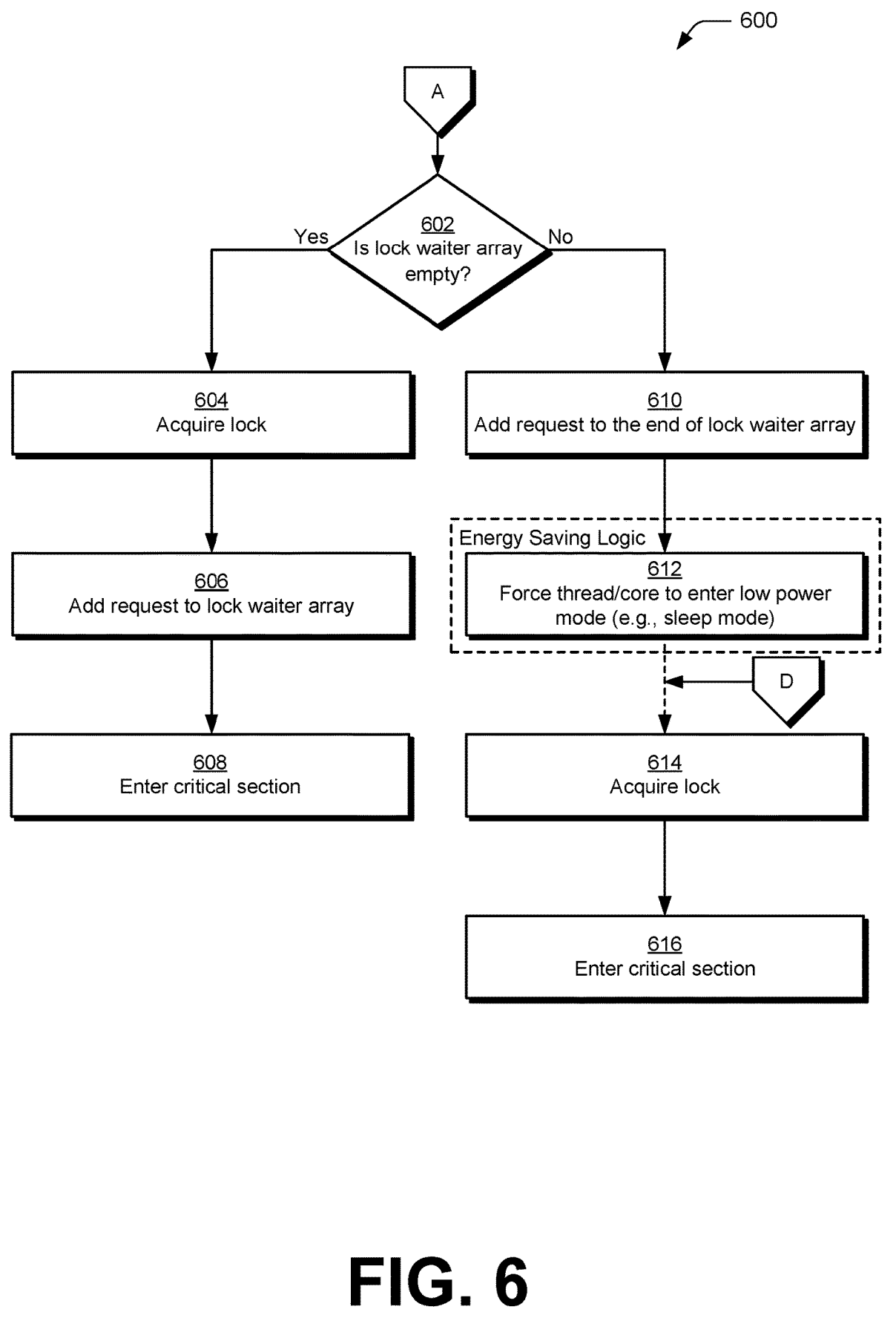

602
Is lock waiter array empty?

Yes → 604 Acquire lock

No → 610 Add request to the end of lock waiter array

606
Add request to lock waiter array

Energy Saving Logic
612
Force thread/core to enter low power mode (e.g., sleep mode)

D

608
Enter critical section

614
Acquire lock

616
Enter critical section

FIG. 6

HARDWARE-ASSISTED SPINLOCK

BACKGROUND

Spinlocks are synchronization primitives used to protect shared resources from concurrent access, ensuring that only one thread (or core, in multi-core systems) accesses a shared resource at a given time. Kernels utilize spinlocks to ensure data consistency and protect critical sections, especially in multi-threaded and multi-core environments. Spinlocks are particularly favored for short-duration access to shared resources and in contexts where sleeping is impermissible, such as during interrupt handling. Kernels often employ hierarchical locking to prevent deadlocks and might use variants like read/write spinlocks for resources frequently read but seldom modified. Additionally, modern kernels may offer debugging tools for spinlock usage and adaptive mechanisms that trade-off between spinning and context-switching. Given the architecture-specific nature of spin-locks, spinlocks are often tailored to the atomic operations of the underlying processor architecture.

BRIEF DESCRIPTION OF THE DRAWINGS

FIG. 4 is a block diagram depicting a non-limiting example lock waiter array entry having various fields.

FIG. 6 is a flow diagram depicting a method for handling lock acquire requests and implementing energy saving logic.

DETAILED DESCRIPTION

Overview

Figure 1:
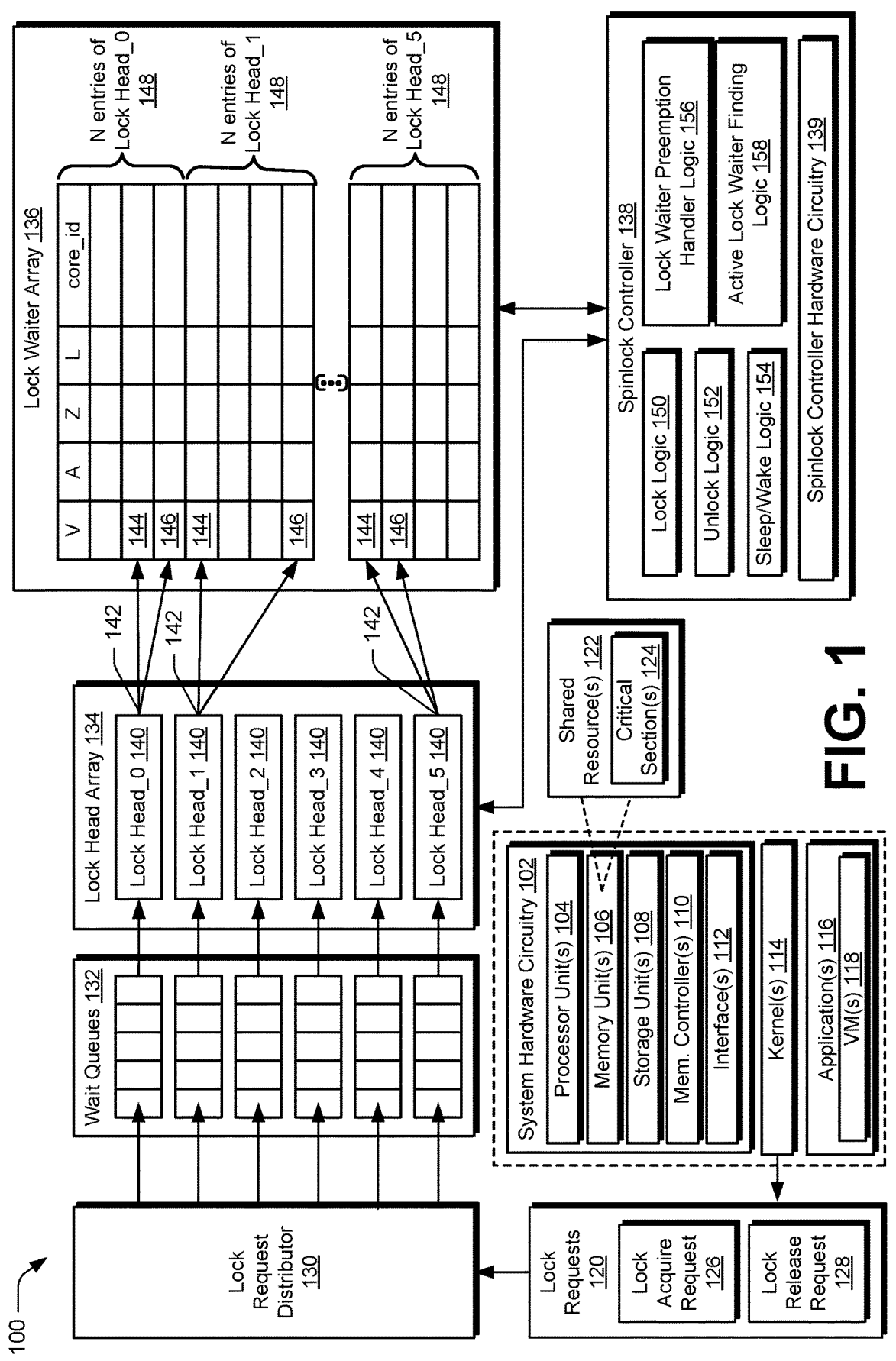
FIG. 1 is a block diagram depicting a non-limiting example system configured to implement a hardware-assisted spinlock to handle lock waiter preemption conditions.

Currently, kernels use different spinlock implementations for bare metal systems and virtualized systems (e.g., virtual machines (VMs)). On bare metal systems, the kernel uses queued spinlocks which are inherently fair by maintaining a queue of waiting threads. On virtualized systems, the kernel uses pvspinlock (paravirtualized spinlock; inherently fair lock) or "test-and-set" lock (inherently unfair lock).

In basic spinlock implementations, when a lock is held, any other thread that wants to acquire the lock will "spin" in a tight loop, repeatedly checking if the lock is available. This often leads to issues such as cache thrashing and starvation. Cache thrashing occurs when multiple CPUs or threads check and attempt to modify a lock variable simultaneously, which causes excessive cache line bouncing between CPU cores. Starvation occurs because there is no guarantee about the order in which waiting threads will acquire a lock. For example, a thread might get unlucky and wait for a long time (or forever in some instances) if other threads keep acquiring the lock before it does. Basic spinlock implementations are inherently unfair for these reasons.

Queued spinlock implementations address the unfairness issue of basic spinlock implementations by maintaining a queue of waiting threads. When a thread wants to acquire a queued spinlock and finds that the queued spinlock is taken, the thread does not repeatedly check the main lock variable. Instead, each waiting thread has its own local variable (often a node in the queue) that it spins on. The releasing thread then hands off the lock to the next thread in the queue directly, ensuring that threads acquire the lock in the order of the queue. Since each waiting thread spins on its own local variable (rather than a shared lock variable), cache thrashing is significantly reduced. Because threads are served in the order of the queue, there is an inherent guarantee that each thread will eventually acquire the lock, preventing starvation. Queued spinlock implementations are inherently fair for these reasons.

The difference in lock implementations between bare metal systems and virtualized systems is because of the performance impacts caused by lock holder preemption and lock waiter preemption on queued spinlock implementations in virtualized environments. In virtualized environments, multiple VMs share the underlying physical hardware. A hypervisor manages the scheduling of virtual CPUs (vCPUs) of VMs on physical CPUs. Both lock holder preemption and lock waiter preemption are problems that arise due to the interplay of spinlocks and scheduling decisions made by the hypervisor.

Lock holder preemption occurs when the vCPU that holds a spinlock is preempted by the hypervisor. As a result, the spinlock remains held, even though the vCPU is not actively running. Other vCPUs or threads that are trying to acquire the same spinlock will end up spinning unnecessarily, thus wasting CPU cycles. These vCPUs or threads are waiting for a spinlock to be released by a vCPU that is not executing.

Hypervisors use techniques like "pause-loop exiting" or "yield-on-spin" to detect when a spinning vCPU is waiting for a lock held by a preempted vCPU. The hypervisor then reschedules the lock holder more quickly or yields the spinning vCPU to reduce power consumption.

Lock waiter preemption occurs when a vCPU trying to acquire a spinlock is preempted by the hypervisor. Even if the spinlock becomes available shortly afterward, the wait-ing vCPU is not immediately aware because it is not running. Lock waiter preemption causes overall system performance to degrade because the resource protected by the spinlock remains underutilized. The duration of the spinlock being held is often artificially extended because the lock waiter, which might be the next potential lock holder, is not running.

Hypervisors prioritize rescheduling vCPUs that were pre-empted while waiting for spinlocks. Another strategy involves identifying contention scenarios and temporarily boosting the priority of contending vCPUs. In both cases, a challenge arises from the juxtaposition of two layers of scheduling: the internal scheduling of threads within the VM and hypervisor scheduling of vCPUs on physical CPUs. Efficiently managing spinlocks in virtualized environments requires sophisticated coordination and often necessitates specialized hypervisor features to recognize and respond to these scenarios.

A hardware-assisted spinlock is described. The hardware-assisted spinlock uses the same spinlock implementation on both bare metal systems and virtual systems. The hardware-assisted spinlock handles lock waiter preemption. The hard-ware-assisted spinlock introduces logic to eliminate energy consumption due to unwanted spinning of lock waiters.

Multi-core systems that utilize a split L3 cache architec-ture are particularly vulnerable to unfairness caused by the cache thrashing issues inherent in test-and-set spinlock implementations used in virtualized systems. This often results in kernel soft lockup watchdog timeouts under lock contention in virtualized systems. The described hardware-assisted spinlock removes lock unfairness in multi-core systems that utilize a split L3 cache architecture by allowing virtualized systems to take advantage of a queued spinlock.

An example hardware-assisted spinlock system includes a lock request distributor, a wait queue, a lock head array, a lock waiter array, and a spinlock controller. The lock request distributor is configured to distribute lock requests, such as a lock acquire request or a lock release request. Each spinlock has a lock head that is mapped to a lock request. The number of lock heads is finite and is configured based on statistical data collected from real-world applications. In some implementations, the number of lock heads is greater than or equal to the number of cores in the system. The lock heads are configured in the lock head array. The lock head array has pointers which point to a current lock holder and a last requester entry in the lock waiter array. The lock waiter array holds N entries (e.g., equal to the number of logical cores) corresponding to each lock head. N entries of each lock form a circular buffer. The spinlock controller is configured to control lock and unlock operations, core sleep and wake-up functions, find active lock waiters, and handle lock waiter preemption.

The disclosed hardware-assisted spinlock system provides several advantages over existing systems. The hardware-assisted spinlock system reduces or eliminates unwanted energy consumption arising from spinning lock waiters. The hardware-assisted spinlock system provides a spinlock implementation for kernel spinlocks that is equally applicable to both bare metal and virtualized systems. The hardware-assisted spinlock system does not require any changes to existing software interfaces of kernel spinlocks. The hardware-assisted spinlock system improves the fairness and performance of spinlocks on VMs that execute on underlying hardware which uses a split L3 architecture.

In some aspects, the techniques described herein relate to a system including: a plurality of wait queues implemented in a first portion of a memory unit configured to store a plurality of lock requests, a lock head array implemented in a second portion of the memory unit configured to store a plurality of lock heads, wherein each wait queue of the plurality of wait queues is mapped to one lock head in the lock head array, a lock waiter array implemented in a third portion of the memory unit configured to store a number of entries corresponding to each lock head in the lock head array, and a spinlock controller comprising hardware circuitry configured to execute a lock logic responsive to a lock acquire request of the plurality of lock requests, and execute an unlock logic responsive to a lock release request of the plurality of lock requests.

In some aspects, the techniques described herein relate to a system, further including a number of processor cores.

In some aspects, the techniques described herein relate to a system, wherein the number of entries held by the lock waiter array is equal to the number of processor cores.

In some aspects, the techniques described herein relate to a system, wherein the number of processor cores includes one or more hardware processor cores.

In some aspects, the techniques described herein relate to a system, wherein the number of processor cores includes one or more virtual processor cores.

In some aspects, the techniques described herein relate to a system, wherein the spinlock controller is configured to execute the lock logic to, in response to the number of entries in the lock waiter array being empty: allow a thread associated with the lock acquire request to acquire a lock, and add the lock acquire request to the lock waiter array.

In some aspects, the techniques described herein relate to a system, wherein the spinlock controller is configured to execute the lock logic to, in response to one or more of the number of entries in the lock waiter array being full: add the lock acquire request to an end of the lock waiter array and force a processor core on which a thread associated with the lock acquire request to reduce power consumption.

In some aspects, the techniques described herein relate to a system, wherein the spinlock controller is configured to execute the lock logic to allow the thread associated with the lock acquire request to acquire a lock and force the processor core on which the thread is running to a normal operating state (e.g., normal power consumption and normal operating frequency).

In some aspects, the techniques described herein relate to a system, wherein the spinlock controller is configured to execute the unlock logic to get a next active lock waiter from the lock waiter array, invalidate a lock waiter entry associated with the next active lock waiter, update the lock waiter array, and wake up a thread associated with the next active lock waiter, In some aspects, the techniques described herein relate to a system, wherein the spinlock controller, in being configured to get the next active lock waiter, is configured to execute the unlock logic to check whether a next lock waiter is active, and in response to the next lock waiter being active, identifying the next lock waiter as the next active lock waiter.

In some aspects, the techniques described herein relate to a system, wherein the spinlock controller, in being configured to get the next active lock waiter, is configured to execute the unlock logic to check whether a next lock waiter is active, and in response to the next lock waiter being inactive, performing a handover of a lock to a first active lock waiter in the lock waiter array.

In some aspects, the techniques described herein relate to a spinlock controller including: a lock logic, an unlock logic, and a hardware circuitry configured to: execute the lock logic responsive to a lock acquire request and execute the unlock logic responsive to a lock release request.

In some aspects, the techniques described herein relate to a spinlock controller, wherein the hardware circuitry is configured to execute the lock logic to, in response to a number of entries in a lock waiter array being empty: allow a thread associated with the lock acquire request to acquire a lock, and add the lock acquire request to the lock waiter array.

In some aspects, the techniques described herein relate to a spinlock controller, wherein the hardware circuitry is configured to execute the lock logic to, in response to one or more entries in a lock waiter array being full: add the lock acquire request to an end of the lock waiter array and force a processor core on which a thread associated with the lock acquire request is running to reduce power consumption.

In some aspects, the techniques described herein relate to a spinlock controller, wherein the hardware circuitry is configured to execute the lock logic to allow the thread associated with the lock acquire request to acquire a lock and force the processor core on which the thread is running to return to a normal operating state (e.g., normal power consumption and normal operating frequency).

In some aspects, the techniques described herein relate to a spinlock controller, wherein the hardware circuitry is configured to execute the unlock logic to get a next active lock waiter from a lock waiter array, invalidate a lock waiter entry associated with the next active lock waiter, update the lock waiter array, and wake up a thread associated with the next active lock waiter, In some aspects, the techniques described herein relate to a spinlock controller, wherein the hardware circuitry, in being configured to get the next active lock waiter, is configured to execute the unlock logic to check whether a next lock waiter is active, and in response to the next lock waiter being active, identifying the next lock waiter as the next active lock waiter.

In some aspects, the techniques described herein relate to a spinlock controller, wherein the hardware circuitry, in being configured to get the next active lock waiter, is configured to execute the unlock logic to check whether a next lock waiter is active, and in response to the next lock waiter being inactive, performing a handover of a lock to a first active lock waiter in the lock waiter array.

In some aspects, the techniques described herein relate to a method including: distributing, by a lock request distributor, a plurality of lock requests to a plurality of wait queues, wherein each wait queue of the plurality of wait queues is mapped to a lock head in a lock head array, holding, by a lock waiter array, a number of entries corresponding to each lock head in the lock head array, executing, by a spinlock controller, a lock logic responsive to a lock acquire request of the plurality of lock requests, and executing, by the spinlock controller, an unlock logic responsive to a lock release request of the plurality of lock requests.

In some aspects, the techniques described herein relate to a method, wherein: executing the lock logic responsive to the lock acquire request includes: allowing a thread associated with the lock acquire request to acquire a lock responsive to the number of entries in the lock waiter array being empty, adding the lock acquire request to the lock waiter array responsive to the number of entries in the lock waiter array being empty, adding the lock acquire request to an end of the lock waiter array responsive to one or more of the number of entries in the lock waiter array being full, and forcing a processor core on which the thread associated with the lock acquire request to reduce power consumption responsive to one or more of the number of entries in the lock waiter array being full, and executing the unlock logic responsive to the lock release request includes: getting a next active lock waiter from the lock waiter array by: checking whether a next lock waiter is active, identifying the next lock waiter as the next active lock waiter responsive to the next lock waiter being active, and performing a handover of a lock to a first active lock waiter in the lock waiter array responsive to the next lock waiter being inactive, invalidating a lock waiter entry associated with the next active lock waiter, updating the lock waiter array, and waking up a thread associated with the next active lock waiter.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

The detailed description is described with reference to the accompanying figures. Entities represented in the figures are indicative of one or more entities and thus reference is made interchangeably to single or plural forms of the entities in the discussion.

Example Environment

FIG. 1 is a block diagram of a non-limiting example system 100. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The illustrated system 100 includes system hardware circuitry 102. In the illustrated example, the system hardware circuitry 102 includes one or more processor units 104, one or more memory units 106, one or more storage units 108, and one or more memory controllers 110, all communicatively coupled via one or more interfaces 112.

In one or more implementations, the processor unit 104 includes one or more cores that read and execute instructions of one or more kernels 114 and/or one or more applications 116 which are stored in the storage unit 108 and loaded into the memory unit 106 for access by the processor unit 104 for processing. Examples of the processor unit 104 include, but are not limited to, a central processing unit (CPU), a graphics processing unit (GPU), a field programmable gate array (FPGA), an accelerated processing unit (APU), and a digital signal processor (DSP). Moreover, the processor unit 104 includes physical, virtual, or a combination of both physical and virtual components (e.g., CPU and/or vCPUs). As such, the system 100 is intended to represent both bare metal systems and virtualization environments, in which the former includes physical hardware and the latter includes virtual machines executing on physical hardware.

In one or more implementations, the memory unit 106 is a circuit board (e.g., a printed circuit board). In some variations, one or more integrated circuits of the memory unit 106 are mounted on the circuit board. Examples of the memory unit 106 include, but are not limited to, single in-line memory module (SIMM), dual in-line memory module (DIMM), small outline DIMM (SODIMM), microDIMM, load-reduced DIMM, registered DIMM (R-DIMM), non-volatile DIMM (NVDIMM), high bandwidth memory (HBM), and the like. In one or more implementations, the memory unit 106 is implemented on a single integrated circuit device. In some examples, the memory unit 106 is composed of multiple chips implemented as vertical ("3D") stacks, placed side-by-side on an interposer or substrate, or assembled via a combination of vertical stacking and side-by-side placement.

The memory units 106 are devices or systems used to store information for immediate use in a device (e.g., by the processor unit 104). In one or more implementations, the memory units 106 correspond to semiconductor memory where data is stored within memory cells on one or more integrated circuits. In at least one example, the memory units 106 correspond to or include volatile memory, examples of which include random-access memory (RAM), dynamic random-access memory (DRAM), synchronous dynamic random-access memory (SDRAM) (e.g., single data rate (SDR) SDRAM or double data rate (DDR) SDRAM), and static random-access memory (SRAM). The memory units 106, in some implementations, include one or more cache layers, each varying in size and speed (e.g., L1, L2, and L3 caches). Generally, the caches store frequently used information, including instructions and data associated with the kernel(s) 114 and/or the application(s) 116. The illustrated memory unit(s) 106 are intended to encompass both system memory (e.g., RAM) and cache memory. As such, the processor unit 104, in some implementations, includes at least a portion of the memory units 106 as cache memory.

The storage units 108 correspond to or include non-volatile storage devices, such as hard disk drives (HDDs) or solid-state drives (SSDs). HDDs use magnetic storage by writing data onto spinning disks, whereas SSDs use flash memory cells, which are non-volatile transistors that retain data even when power is switched off. The storage unit(s) 108 are configured to store data and instructions associated with the kernel(s) 114 and the application(s) 116.

The interfaces 112 correspond to or include one or more wired and/or one or more wireless connections between components of the system hardware circuitry 102. Example wired connections include, but are not limited to, buses (e.g., a data bus), interconnects, traces, and planes. In some implementations, the interfaces 112 provide an input/output (I/O) subsystem which handles communication between the system 100 and external devices (not shown). For example, the I/O subsystem includes controllers and ports for communication standards such as universal serial bus (USB), high-definition multiple interface (HDMI), and the like. The interfaces 112 manage data flow and direct communication between the processor units 104, the memory units 106, the storage units 108, and the memory controllers 110.

The memory controller 110 manages and optimizes data flow between the processor unit 104 and the memory unit 106. In some implementations, the memory controller 110 is separate from the processor unit 104 and operates in communication with the processor unit 104 via the interface 112. Alternatively, the memory controller 110 is designed as part of the processor unit 104.

The kernel 114 is a component of an operating system. The kernel 114 acts as a bridge between the application(s) 116 and the actual data processing done at the hardware level in the system hardware circuitry 102. The kernel 114 is the core part of the operating system that loads first and remains in the main memory, such as the memory unit 106, while the system 100 is operating. Primary responsibilities of the kernel 114 include managing system resources and facilitating communication between hardware components (e.g., the system hardware circuitry 102) and software components (e.g., the application(s) 116).

At the hardware level, the kernel 114 interacts directly with the memory unit 106, the processor unit 104, and any I/O devices (not shown) connected to the system 100 via the interface(s) 112. The kernel 114 uses a variety of data structures like tables to manage resources, for instance, a process table for tracking processes, memory tables for managing memory allocations, and I/O buffers for device operations. Device drivers, either integrated into the kernel 114 or loadable as modules, allow the kernel 114 to communicate and control hardware peripherals. Device drivers translate the generic I/O instructions provided by the kernel 114 into device-specific operations useable by the peripherals.

The kernel 114 provides a set of system calls that the applications 116 use. When an application 116 wants to request a service from the operating system, like reading a file or sending data over a network, the application 116 initiates a system call to the kernel 114. This system call transitions the system 100 from user mode, where the application 116 runs, to kernel mode, where the operating system has full control over system resources. Once in kernel mode, the requested operation is executed, after which control is given back to the application 116 in user mode.

Multitasking, the capability of the operating system to seemingly run multiple applications simultaneously, is also managed by the kernel 114. The kernel 114 uses scheduling algorithms to determine which process gets access to the processor unit 104 and for how long, ensuring fair and efficient utilization of processor cycles.

Memory management is another responsibility of the kernel 114. The kernel 114 allocates memory spaces to processes, manages virtual memory, and handles page swapping between main memory (e.g., the memory unit 106) and secondary storage (e.g., the storage unit 108). The kernel 114 ensures that each process considers its memory space private, even though the processes share the same physical memory space. Furthermore, the kernel 114 handles system security and access control, ensuring that unauthorized access to system resources is prevented, and each process is isolated from others to prevent interference.

In general, the kernel 114 acts as a mediator, ensuring smooth interactions between user-level applications (e.g., application(s) 116) and system hardware (e.g., system hardware circuitry 102). The kernel 114 abstracts and manages the complexity of hardware operations, providing a consistent and controlled environment for software to operate in.

The applications 116 are software designed to perform specific tasks or functions for an end user and/or another application (local or remote). By way of example, and not limitation, the applications 116 correspond to or include desktop applications, web applications, mobile applications, database applications, enterprise application, real-time applications, embedded applications, multimedia applications, interactive applications, utility applications, and/or the like.

The illustrated applications 116 include one or more VMs 118 which are specialized applications that emulate and virtualize a computer system, offering an environment in which software (e.g., other applications 116) execute as if operating on a physical hardware platform (e.g., the system hardware circuitry 102). In one or more implementations, the VMs 118 utilize a hypervisor to manage the distribution of system resources and to isolate the VMs 118 from each other. This enables multiple OS environments to run on a single physical machine (e.g., the system hardware circuitry 102), with each of the VMs 118 functioning in an encapsulated space, unaware of the presence of other VMs.

With respect to the techniques described herein, the kernel(s) 114 operating as part of bare metal systems (e.g., the system hardware circuitry 102) and/or virtualized systems (e.g., the VMs 118) are configured to generate lock requests 120. The kernel(s) 114 employ locks to ensure that shared resources 122, such as a critical section 124 of code, is accessed by only one thread or process at any given moment. In this manner, the kernel 114 prevents race conditions, upholds data consistency, and efficiently manages the shared resources 122. Before accessing the shared resources 122, the kernel first requests a lock via a lock request 120. If the lock is available, the kernel 114 successfully acquires it, specifically, via a lock acquire request 126. Otherwise, depending on the type of lock and the situation, the kernel 114 either waits for the lock to become available or temporarily yield its execution, allowing other processes to run. After completing its task within the critical section 124, the kernel 114 releases the lock, specifically, via a lock release request 128, making the lock accessible for other processes or threads.

The lock requests 120 are a thread or processes attempt to acquire a lock to ensure exclusive access to the shared resource 122, such as the critical section 124 of code. Unlike traditional locks where a thread goes to sleep if the thread cannot acquire the lock, thereby freeing up the CPU, a spinlock operates differently. When a thread issues a lock request 120 for a spinlock and finds the lock currently held by another thread, the thread does not immediately go to sleep. Instead, the thread "spins," which, in other words, means the thread enters a tight loop where the thread repeatedly checks if the lock has been released.

A core concept behind a spinlock is that if the expected wait time is very short, it will be more efficient for the thread to remain active (i.e., by spinning) rather than incurring the overhead of being de-scheduled and later woken up, which is the typical behavior with other locking mechanisms. However, if the lock remains unavailable for a long time, a spinning thread wastes significant processor resources which wastes energy thus decreasing efficiency of the system overall. This problem is exacerbated greatly if multiple threads are spinning simultaneously Currently, kernels use different spinlock implementations for bare metal systems and virtual machines. On bare metal systems, kernels use queued spinlocks which are inherently fair. On VMs, kernels use a pvspinlock (paravirtualized spinlock) or a "test-and-set" lock which are inherently unfair. The difference in lock implementations is because of the performance impacts caused by lock holder preemption and lock waiter preemption on queued spinlock implementations in virtualized environments. Moreover, in virtualized environments, multiple VMs share the underlying physical hardware. A hypervisor manages the scheduling of virtual CPUs (vCPUs) of VMs on physical CPUs. Both lock holder preemption and lock waiter preemption are problems that arise due to the interplay of spinlocks and scheduling decisions made by the hypervisor.

Lock holder preemption occurs when the vCPU that holds a spinlock is preempted by the hypervisor. As a result, the spinlock remains held, even though the vCPU is not actively running. Other vCPUs or threads that are trying to acquire the same spinlock will end up spinning unnecessarily, thus wasting CPU cycles. These vCPUs or threads are waiting for a spinlock to be released by a vCPU that is not executing. Hypervisors use techniques like "pause-loop exiting" or "yield-on-spin" to detect when a spinning vCPU is waiting for a lock held by a preempted vCPU. The hypervisor then reschedules the lock holder more quickly or yields the spinning vCPU to reduce power consumption.

Lock waiter preemption occurs when a vCPU trying to acquire a spinlock is preempted by the hypervisor. Even if the spinlock becomes available shortly afterward, the waiting vCPU is not immediately aware because it is not running. Lock waiter preemption causes overall system performance to degrade because the resource protected by the spinlock remains underutilized. The duration of the spinlock being held is often artificially extended because the lock waiter, which might be the next potential lock holder, is not running.

Hypervisors prioritize rescheduling vCPUs that were preempted while waiting for spinlocks. Another strategy involves identifying contention scenarios and temporarily boosting the priority of contending vCPUs. In both cases, a challenge arises from the juxtaposition of two layers of scheduling: the internal scheduling of threads within the VM and hypervisor scheduling of vCPUs on physical CPUs. Efficiently managing spinlocks in virtualized environments requires sophisticated coordination and often necessitates specialized hypervisor features to recognize and respond to these scenarios.

The remaining description of the system 100 focuses on a hardware-assisted spinlock that uses the same spinlock implementation on both bare metal systems (e.g., the system hardware circuitry 102) and virtual systems (e.g., the VMs 118 executing on top of the system hardware circuitry 102). The hardware-assisted spinlock handles lock waiter preemption. The hardware-assisted spinlock introduces logic to eliminate energy consumption due to unwanted spinning of lock waiters.

Multi-core systems that utilize a split L3 cache architecture are particularly vulnerable to unfairness caused by test-and-set spinlock implementations in virtualized systems. This often results in kernel soft lockup watchdog timeouts under lock contention in virtualized systems. The described hardware-assisted spinlock removes lock unfairness in multi-core systems that utilize a split L3 cache architecture.

To provide the hardware-assisted spinlock, the system 100 includes a lock request distributor 130, a plurality of wait queues 132, a lock head array 134, and a lock waiter array 136. By way of example and not limitation, the lock request distributor 130, the plurality of wait queues 132, the lock head array 134, and the lock waiter array 136 are implemented as data structures, software, algorithms, hardware instructions, system calls, firmware, middleware, microcode, hardware description languages, or any combination thereof. In one or more implementations, the lock request distributor 130 is configured to distribute the lock request 120 to the plurality of wait queues 132 which reside in a portion of the memory unit 106. Similarly, the lock head array 134 and the lock waiter array 136, in some implementations, reside in the same or a different portion of the memory unit 106.

The system 100 also includes a spinlock controller 138. The spinlock controller 138 is implemented in hardware and provides the hardware-assist functionality of the described hardware-assisted spinlock. The spinlock controller 138 utilizes spinlock controller hardware circuitry 139 to perform, at least in part, procedures described herein.

Aspects of procedures are implemented in hardware, firmware, software, or a combination thereof. The procedures are depicted as flow diagrams in FIGS. 5-8 as a set of blocks that specify operations performable by hardware, such as the spinlock controller hardware circuitry 139, and are not necessarily limited to the orders shown for performing the operations by the respective blocks. Blocks of the procedures, for instance, specify operations programmable by hardware (e.g., processor, microprocessor, controller, and/or firmware) as instructions thereby creating a special purpose machine for carrying out one or more algorithms as illustrated by the flow diagrams. As a result, the instructions are storable on a computer-readable storage medium that causes the hardware to perform the algorithms.

In one or more implementations, the spinlock controller hardware circuitry 139 is part of the system hardware circuitry 102, such as implemented on a die that includes one or more of the processor units 104. Alternatively, the spinlock controller hardware circuitry 139 is stand alone circuitry fabricated as a chipset or other integrated circuit communicatively coupled to the system hardware circuitry 102 or some hardware component thereof.

The lock request distributor 130 is configured to distribute the lock requests 120 issued by the kernel(s) 114, including kernels 114 operating as part of bare metal systems and virtual systems. As briefly introduced above, a lock request 120 is either a lock acquire request 126 or a lock release request 128.

Each spinlock has a lock head 140 that is mapped to a lock request 120. The number of lock heads 140 is finite and is configured based on statistical data collected from real-world applications. In some implementations, the number of lock heads 140 is greater than or equal to four times the number of logical cores (e.g., physical, virtual, or both) in the system 100. The lock heads 140 are configured in the lock head array 134. The lock head array 134 has pointers 142 which point to a current lock holder 144 and a last requester entry 146 in the lock waiter array 136. The lock waiter array 136 holds N entries 148 (e.g., equal to the number of logical cores) corresponding to each lock head 140. The N entries 148 of each lock head 140 form a circular buffer in the lock waiter array 136.

The illustrated spinlock controller 138 includes lock logic 150, unlock logic 152, sleep/wake logic 154, lock waiter preemption handler logic 156, and active lock waiter finding logic 158, all of which are executed by or as part of the spinlock controller hardware circuitry 139 to perform various operations. As used herein, "logic" refers to the design and operation of specific functionality provided by the spinlock controller hardware circuitry 139. In some implementations, "logic" includes specific circuitry within the spinlock controller hardware circuitry 139 that is configured to perform specific operations. In other implementations, "logic" includes hardware-executable instructions that, when executed by hardware (e.g., the spinlock controller hardware circuitry 139), cause the hardware to perform specific operations. As such, the lock logic 150, the unlock logic 152, the sleep/wake logic 154, the lock waiter preemption handler logic 156, and the active lock waiter finding logic 158 are either integrated as part of the spinlock controller hardware circuitry 139 or include instruction sets executed by the spinlock controller hardware circuitry 139 or specific portions thereof.

In particular, the lock logic 150 is executed by the spinlock controller hardware circuitry 139 to control lock operations (e.g., responsive to lock acquire requests 126); the unlock logic 152 is executed by the spinlock controller hardware circuitry 139 to control unlock operations (e.g., responsive to lock release requests 128); the sleep/wake logic 154 is executed by the spinlock controller hardware circuitry 139 to control core sleep and wake-up operations, the lock waiter preemption handler logic 156 is executed by the spinlock controller hardware circuitry 139 to perform lock waiter preemption handling operations; and the active lock waiter finding logic 158 is executed by the spinlock controller hardware circuitry 139 to perform active lock waiter finding operations. The aforementioned operations performed by the spinlock controller 138 will be described in greater detail below.

Figure 2:
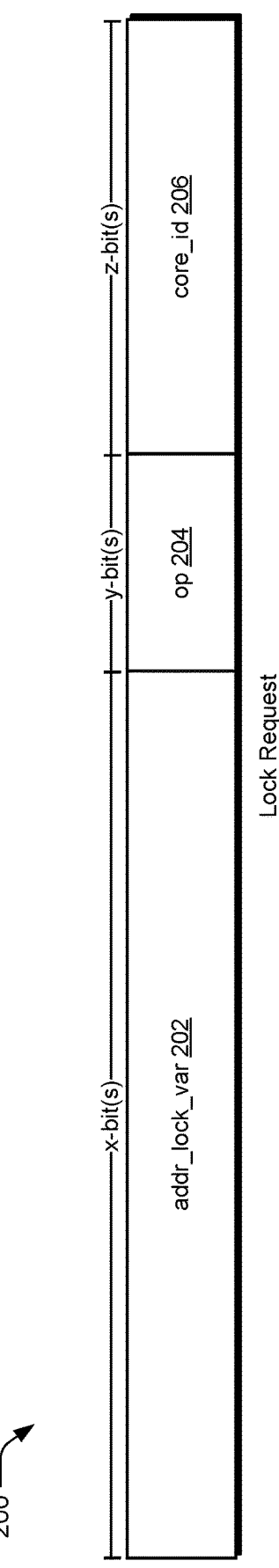
FIG. 2 is a block diagram depicting a non-limiting example lock request having various fields.

FIG. 2 depicts a non-limiting example lock request 200, such as one of the lock requests 120. The example lock request 200 includes an address lock variable field 202 (addr_lock_var), an operation field 204 (op), and a core identifier field 206 (core_id).

Figure 3:
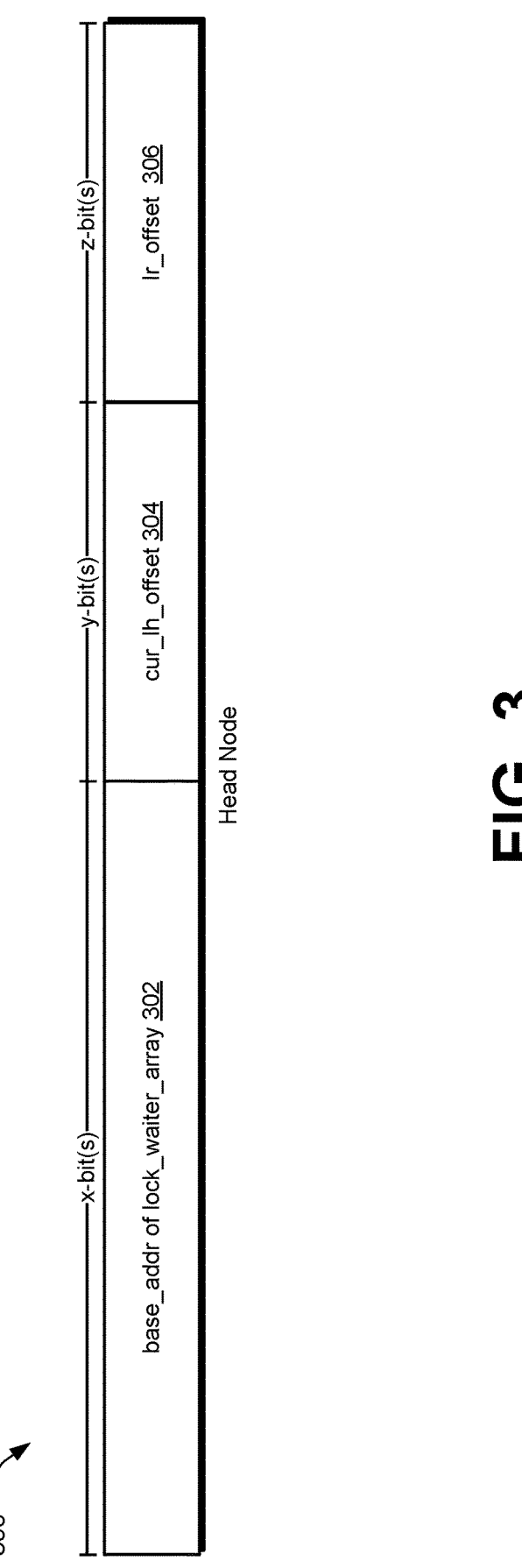
FIG. 3 is a block diagram depicting a non-limiting example head node entry having various fields.

FIG. 3 depicts a non-limiting example lock head node entry 300, such as for one of the lock heads 140 in the lock head array 134. The example lock head node entry 300 includes a base address of lock waiter array field 302 (base_addr of lock_waiter_array), a current lock holder offset field 304 (cur_lh_offset), and a last requester offset field 306 (lr_offset). The current lock holder offset field 304 and the last requester offset field 306 include the pointers 142 to the current lock holder and the last requester entries in the lock waiter array 136.

FIG. 4 depicts a non-limiting example lock waiter array entry 400, such as for one of the entries in the lock waiter array 136. The lock waiter array 136 holds N entries (e.g., the number of logical cores) corresponding to each of the lock heads 140. The example lock waiter array entry 400 includes a valid field 402 (V in FIG. 1), an active field 404 (A in FIG. 1), a zero field 406 (Z in FIG. 1), a lock field 408 (L in FIG. 1), and a core identifier field 410 (core_id). The valid field 402 identifies whether an entry is valid. The active field 404 identifies whether a vCPU or thread is running or active. The zero field 406 is used for avoiding corner cases like the buffer looping issue. The lock field 408 identifies whether the thread is the current lock holder (e.g., 1 means the thread is the current lock holder and 0 means the thread is the lock waiter).

Example Methods

Figure 5:
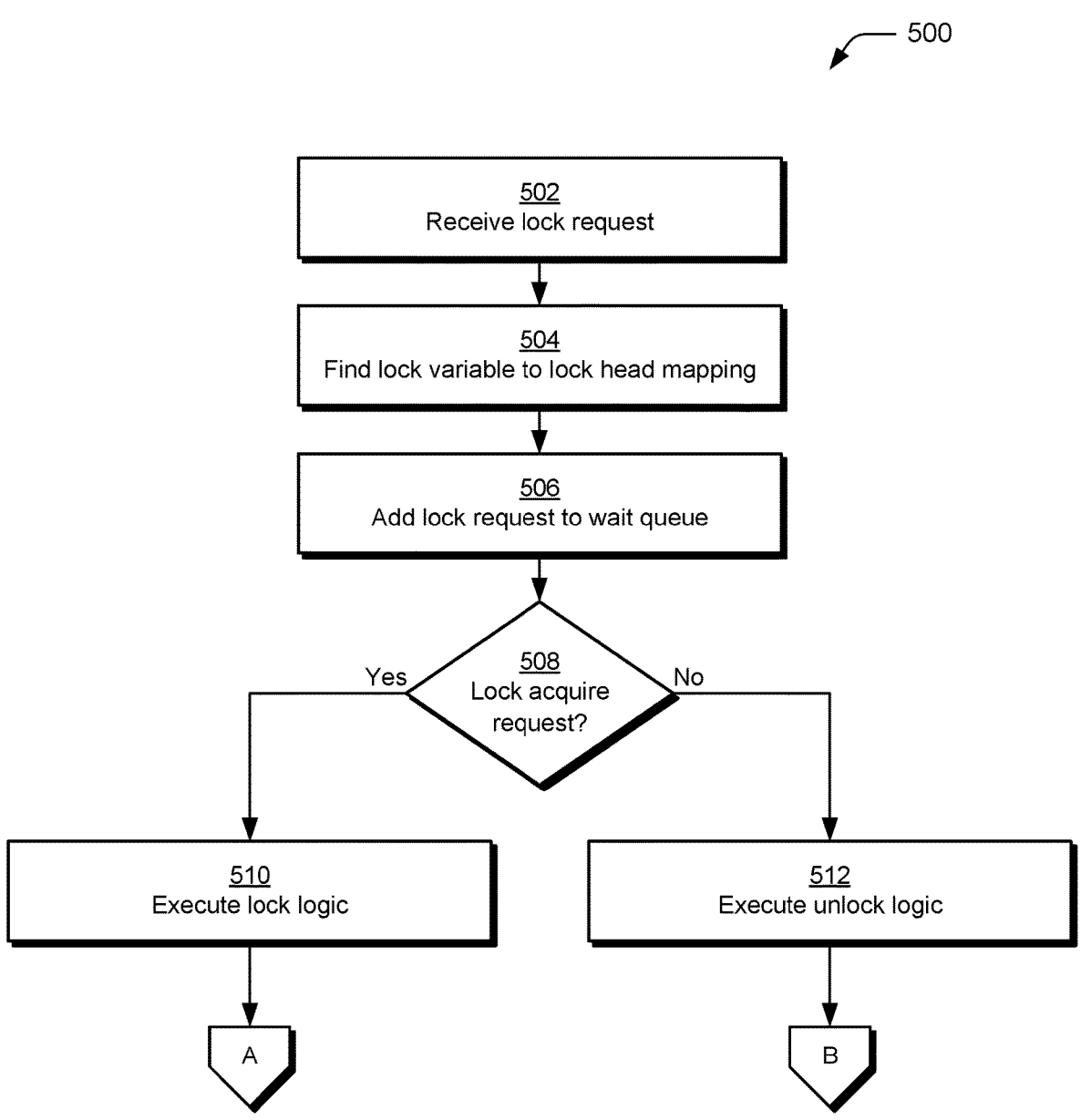
FIG. 5 is a flow diagram depicting a method for handling lock requests.

FIG. 5 is a flow diagram depicting a method 500 for handling lock requests, such as the lock requests 120. The method 500 begins when the lock request distributor 130 receives a lock request 120 (block 502). The lock request distributor 130 analyzes the lock request 120 to find the lock variable to lock head mapping, such as provided in the address lock variable field 202 (block 504). The lock request distributor 130 then adds the lock request 120 to one of the plurality of wait queues 132 (block 506).

The spinlock controller 138 determines whether the lock request 120 is a lock acquire request 126 or a lock release request 128 (block 508). If the spinlock controller 138 determines that the lock request 120 is a lock acquire request 126, the spinlock controller 138 executes the lock logic 150 (block 510) which is described below with reference to FIG. 6. If, however, the spinlock controller 138 determines that the lock request 120 is a lock release request 128, the spinlock controller 138 executes the unlock logic 152 (block 512) which is described below with reference to FIG. 7.

FIG. 6 is a flow diagram depicting a method 600 for handling lock acquire requests, such as the lock acquire request 126, and implementing energy saving via the sleep/wake logic 154. The method 600 begins when the spinlock controller 138 determines whether the lock waiter array 136 is empty (block 602). If the spinlock controller 138 determines that the lock waiter array 136 is empty, the spinlock controller 138 allows, via the lock logic 150, the entity that submitted the lock acquire request 126 to acquire the lock (block 604). The spinlock controller 138 then adds the lock acquire request 126 to the lock waiter array 136 (block 606). The requesting entity (e.g., thread/core) is then permitted to enter the critical section 124 (block 608).

If, however, the spinlock controller 138 determines (block 602) that the lock waiter array 136 is not empty (i.e., the lock waiter array 136 has at least one entry 148), the spinlock controller 138 adds the lock acquire request 126 to the end of the lock waiter array 136 (block 610). The spinlock controller 138 then forces the requesting entity to enter a low power mode (e.g., a sleep mode) via the sleep/wake logic 154 to save energy (block 612). When the spinlock controller 138 determines the lock acquire request 126 is the next lock waiter entry in the lock waiter array 136, the spinlock controller 138 allows, via the lock logic 150, the entity that submitted the lock acquire request 126 to acquire the lock (block 614). The requesting entity (e.g., thread/core) is then permitted to enter the critical section 124 (block 616).

Figure 7:
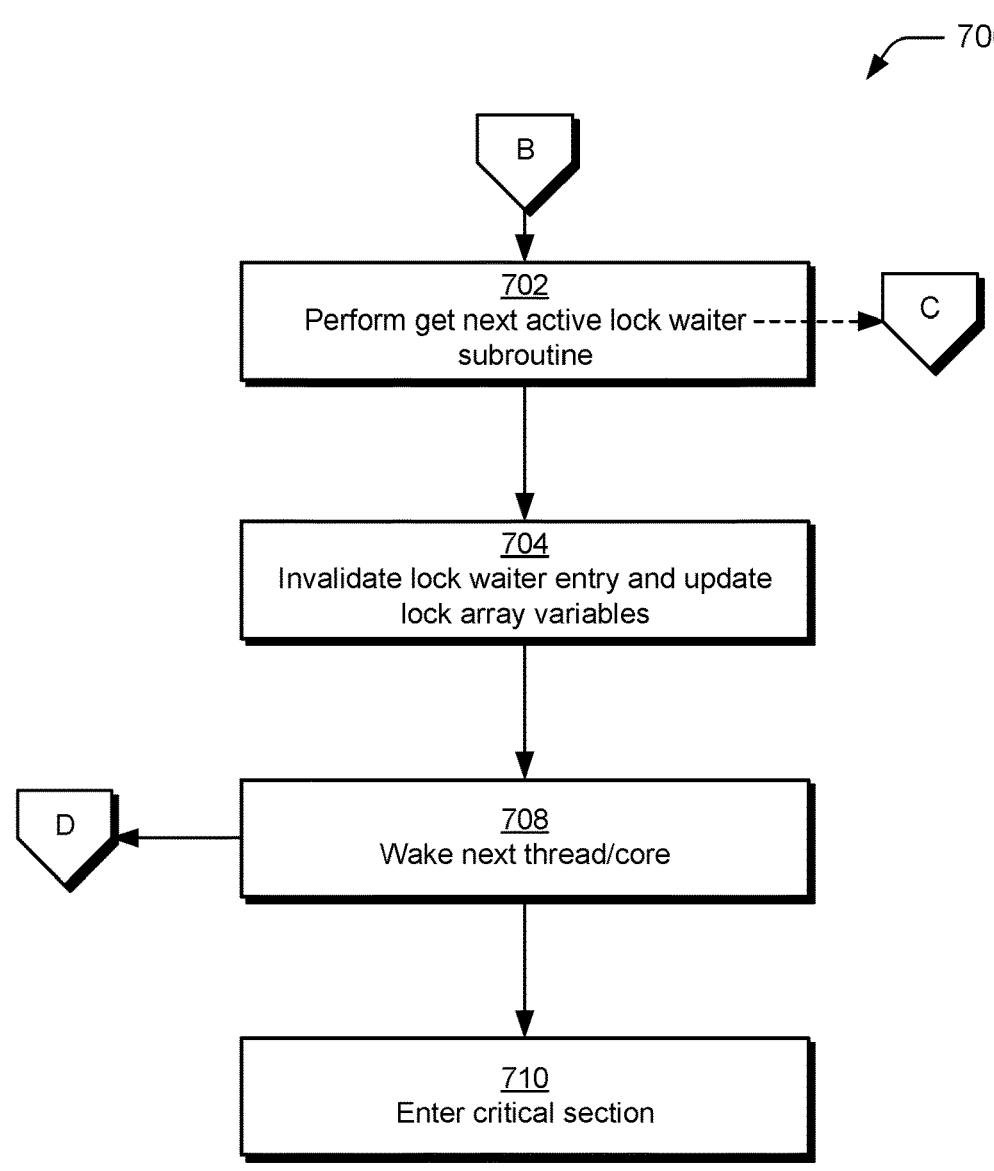
FIG. 7 is a flow diagram depicting a method for handling lock release requests.

FIG. 7 is a flow diagram depicting a method 700 for handling lock release requests, such as the lock release request 128. The method 700 begins when the spinlock controller 138 performs a get next active lock waiter subroutine (block 702), which will be described below with reference to a method 800 depicted in FIG. 8. The spinlock controller 138 then invalidates the next active lock waiter obtained from the output of block 702 and updates the lock array variables accordingly (block 704). The spinlock controller 138 then wakes, via the sleep/wake logic 154, the next thread/core (block 708). The spinlock controller 138, via the lock logic 150, allows the next thread/core to enter the critical section 124 (block 710).

Figure 8:
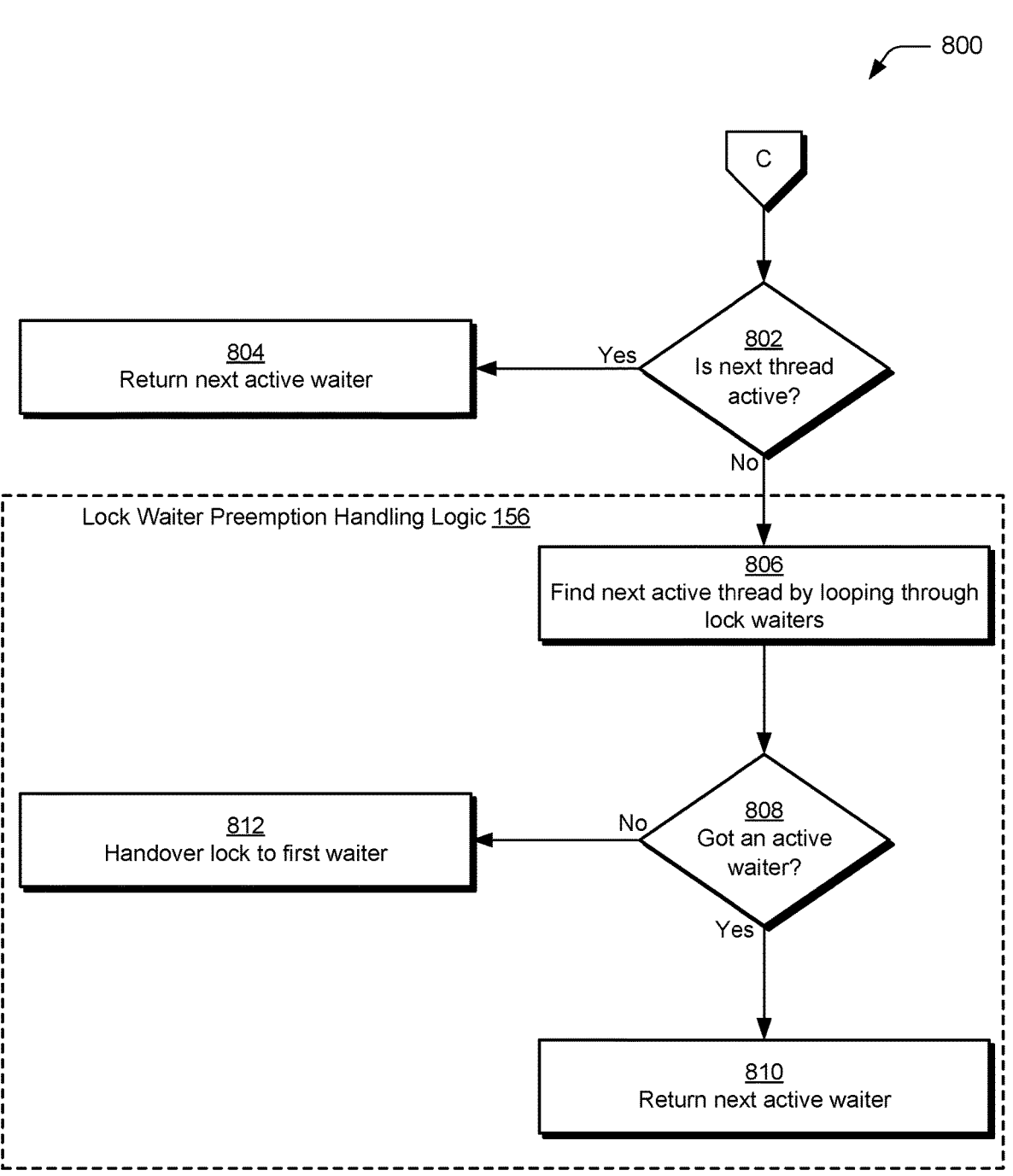
FIG. 8 is a flow diagram depicting a method for handling lock waiter preemption.

FIG. 8 is flow diagram depicting a method 800 for handling lock waiter preemption as a subroutine for block 702 in the method 700 shown in FIG. 7. The method 800 begins when the spinlock controller 138 determines if the next thread is active (block 802). If the spinlock controller 138 determines that the next thread is active, the spinlock controller 138 returns the next thread as the next active waiter (block 804). If, however, the spinlock controller 138 determines that the next thread is inactive, the spinlock controller 138 invokes the lock waiter preemption handler logic 156. In particular, the spinlock controller 138 finds the next active thread by looping through the lock waiters in the lock waiter array 136 (block 806). If the spinlock controller 138 determines (block 808) that an active lock waiter is in the lock waiter array 136, the spinlock controller 138 returns the active lock waiter as the next active waiter (block 810). If, however, the spinlock controller 138 determines (block 808) that an active lock waiter is not in the lock waiter array 136, the spinlock controller 138 performs a handover of the lock to the first waiter in the lock waiter array 136 (block 812).

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein, including, where appropriate, the system hardware circuitry 102, the processor unit 104, the memory unit 106, the storage unit 108, the memory controller 110, the interfaces 112, the kernel 114, the application 116, the VMs 118, the lock request 120, the lock acquire request 126, the lock release request 128, the lock request distributor 130, the plurality of wait queues 132, the lock head array 134, the lock waiter array 136, the spinlock controller 138, the lock heads 140, the pointers 142, the current lock holder 144, the last requester entry 146, the n entries 148, the lock logic 150, the unlock logic 152, the sleep/wake logic 154, the lock waiter preemption handler logic 156, the active lock waiter finding logic 158, the spinlock controller hardware circuitry 139, any combination thereof, are implemented in any of a variety of different manners such as subsystem circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
   a plurality of wait queues implemented in a first portion of a memory unit configured to store a plurality of lock requests;
   a lock head array implemented in a second portion of the memory unit configured to store a plurality of lock heads, wherein each wait queue of the plurality of wait queues is mapped to one lock head in the lock head array;
   a lock waiter array implemented in a third portion of the memory unit configured to store a number of entries corresponding to each lock head in the lock head array; and
   a spinlock controller comprising hardware circuitry configured to:
      execute a lock logic responsive to a lock acquire request of the plurality of lock requests by adding the lock acquire request to the lock waiter array; and
      execute an unlock logic responsive to a lock release request of the plurality of lock requests by obtaining a next active lock waiter from the lock waiter array.

2. The system of claim 1, further comprising a number of processor cores and the memory unit.

3. The system of claim 2, wherein the number of entries held by the lock waiter array is equal to the number of processor cores.

4. The system of claim 2, wherein the number of processor cores includes one or more hardware processor cores.

5. The system of claim 2, wherein the number of processor cores includes one or more virtual processor cores.

6. The system of claim 1, wherein the spinlock controller is configured to execute the lock logic to, in response to the number of entries in the lock waiter array being empty:
   allow a thread associated with the lock acquire request to acquire a lock; and
   add the lock acquire request to the lock waiter array.

7. The system of claim 1, wherein the spinlock controller is configured to execute the lock logic to, in response to one or more of the number of entries in the lock waiter array being full:
   add the lock acquire request to an end of the lock waiter array; and
   force a processor core on which a thread associated with the lock acquire request to reduce power consumption.

8. The system of claim 7, wherein the spinlock controller is configured to execute the lock logic to:
   allow the thread associated with the lock acquire request to acquire a lock; and force the processor core on which the thread is running to a normal operating state.

9. The system of claim 1, wherein the spinlock controller is configured to execute the unlock logic to:
   invalidate a lock waiter entry associated with the next active lock waiter;
   update the lock waiter array; and
   wake up a thread associated with the next active lock waiter.

10. The system of claim 9, wherein the spinlock controller, in being configured to get the next active lock waiter, is configured to execute the unlock logic to:
   check whether a next lock waiter is active; and
   in response to the next lock waiter being active, identifying the next lock waiter as the next active lock waiter.

11. The system of claim 9, wherein the spinlock controller, in being configured to get the next active lock waiter, is configured to execute the unlock logic to:
   check whether a next lock waiter is active; and
   in response to the next lock waiter being inactive, performing a handover of a lock to a first active lock waiter in the lock waiter array.

12. A spinlock controller comprising:
   a lock logic;
   an unlock logic; and
   a hardware circuitry configured to:
      execute the lock logic responsive to a lock acquire request by adding a lock acquire request to a lock waiter array; and
      execute the unlock logic responsive to a lock release request by obtaining a next active lock waiter from the lock waiter array.

13. The spinlock controller of claim 12, wherein the hardware circuitry is configured to execute the lock logic to, in response to a number of entries in the lock waiter array being empty:
   allow a thread associated with the lock acquire request to acquire a lock.

14. The spinlock controller of claim 12, wherein the hardware circuitry is configured to execute the lock logic to, in response to one or more entries in the lock waiter array being full:
   add the lock acquire request to an end of the lock waiter array; and
   force a processor core on which a thread associated with the lock acquire request is running to reduce power consumption.

15. The spinlock controller of claim 14, wherein the hardware circuitry is configured to execute the lock logic to:
   allow the thread associated with the lock acquire request to acquire a lock; and
   force the processor core on which the thread is running to a normal operating state.

16. The spinlock controller of claim 12, wherein the hardware circuitry is configured to execute the unlock logic to:
   invalidate a lock waiter entry associated with the next active lock waiter;
   update the lock waiter array; and
   wake up a thread associated with the next active lock waiter.

17. The spinlock controller of claim 16, wherein the hardware circuitry, in being configured to get the next active lock waiter, is configured to execute the unlock logic to:
   check whether the next lock waiter is active; and
   in response to the next lock waiter being active, identifying the next lock waiter as the next active lock waiter.

18. The spinlock controller of claim 16, wherein the hardware circuitry, in being configured to get the next active lock waiter, is configured to execute the unlock logic to:
   check whether the next lock waiter is active; and
   in response to the next lock waiter being inactive, performing a handover of a lock to a first active lock waiter in the lock waiter array.

19. A method comprising:
   distributing, by a lock request distributor, a plurality of lock requests to a plurality of wait queues, wherein each wait queue of the plurality of wait queues is mapped to a lock head in a lock head array stored in a first portion of a memory unit;
   holding, by a lock waiter array stored in a second portion of the memory unit, a number of entries corresponding to each lock head in the lock head array;
   executing, by a spinlock controller, a lock logic responsive to a lock acquire request of the plurality of lock requests by adding the lock acquire request to the lock waiter array; and
   executing, by the spinlock controller, an unlock logic responsive to a lock release request of the plurality of lock requests by obtaining a next active lock waiter from the lock waiter array.

20. The method of claim 19, wherein:
   executing the lock logic responsive to the lock acquire request comprises:
      allowing a thread associated with the lock acquire request to acquire a lock responsive to the number of entries in the lock waiter array being empty;
      adding the lock acquire request to the lock waiter array responsive to the number of entries in the lock waiter array being empty;
      adding the lock acquire request to an end of the lock waiter array responsive to one or more of the number of entries in the lock waiter array being full; and
      forcing a processor core on which the thread associated with the lock acquire request to reduce power consumption responsive to one or more of the number of entries in the lock waiter array being full; and
   executing the unlock logic responsive to the lock release request comprises:
      getting the next active lock waiter from the lock waiter array by:
         checking whether a next lock waiter is active;
         identifying the next lock waiter as the next active lock waiter responsive to the next lock waiter being active; and
         performing a handover of a lock to a first active lock waiter in the lock waiter array responsive to the next lock waiter being inactive;
      invalidating a lock waiter entry associated with the next active lock waiter;
      updating the lock waiter array; and
      waking up a thread associated with the next active lock waiter.

* * * * *